United States Patent
Matsumura

(10) Patent No.: US 10,174,233 B2
(45) Date of Patent: Jan. 8, 2019

(54) REACTIVE HOT-MELT ADHESIVE COMPOSITION

(71) Applicant: The Yokohama Rubber Co., LTD., Minato-ku, Tokyo (JP)

(72) Inventor: Misaki Matsumura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 183 days.

(21) Appl. No.: 15/323,060

(22) PCT Filed: May 7, 2015

(86) PCT No.: PCT/JP2015/063200
§ 371 (c)(1),
(2) Date: Dec. 29, 2016

(87) PCT Pub. No.: WO2016/002335
PCT Pub. Date: Jan. 7, 2016

(65) Prior Publication Data
US 2017/0174960 A1   Jun. 22, 2017

(30) Foreign Application Priority Data

Jul. 2, 2014 (JP) ................. 2014-136837

(51) Int. Cl.
| | |
|---|---|
| *C09J 175/08* | (2006.01) |
| *C09J 11/06* | (2006.01) |
| *C09J 133/00* | (2006.01) |
| *C09J 175/04* | (2006.01) |
| *C08G 18/48* | (2006.01) |
| *C08G 18/76* | (2006.01) |
| *C08G 18/78* | (2006.01) |
| *C08G 18/81* | (2006.01) |
| *C08G 18/12* | (2006.01) |
| *C08L 75/04* | (2006.01) |
| *C08G 18/67* | (2006.01) |
| *C08G 18/28* | (2006.01) |
| *C09J 175/16* | (2006.01) |

(52) U.S. Cl.
CPC ............ *C09J 175/08* (2013.01); *C08G 18/12* (2013.01); *C08G 18/2865* (2013.01); *C08G 18/4812* (2013.01); *C08G 18/4891* (2013.01); *C08G 18/6715* (2013.01); *C08G 18/7671* (2013.01); *C08G 18/7837* (2013.01); *C08G 18/8166* (2013.01); *C08L 75/04* (2013.01); *C09J 11/06* (2013.01); *C09J 133/00* (2013.01); *C09J 175/04* (2013.01); *C09J 175/16* (2013.01); *C08G 2170/20* (2013.01)

(58) Field of Classification Search
None
See application file for complete search history.

(56) References Cited

U.S. PATENT DOCUMENTS

| | | | | |
|---|---|---|---|---|
| 3,676,385 A | * | 7/1972 | Walus | C08F 299/026 523/454 |
| 3,859,120 A | * | 1/1975 | Schramm | C09D 133/10 428/336 |
| 5,021,507 A | | 6/1991 | Stanley et al. | |
| 5,216,094 A | * | 6/1993 | Isozaki | C08F 8/44 525/118 |
| 2003/0129421 A1 | * | 7/2003 | Terauchi | C08G 18/283 428/447 |
| 2004/0249076 A1 | * | 12/2004 | Slark | C08G 18/4063 525/123 |
| 2011/0236682 A1 | * | 9/2011 | Okamoto | C09J 133/14 428/355 CN |
| 2012/0088844 A1 | * | 4/2012 | Kuyu | C08G 77/42 514/772.3 |
| 2012/0088861 A1 | * | 4/2012 | Huang | C08G 77/42 523/107 |
| 2012/0121900 A1 | * | 5/2012 | Niwa | C09J 7/26 428/355 AC |
| 2013/0345354 A1 | * | 12/2013 | Tamogami | C08G 18/12 524/507 |
| 2014/0024781 A1 | | 1/2014 | Tamogami et al. | |
| 2014/0107278 A1 | * | 4/2014 | Ozaki | C08G 18/8116 524/516 |
| 2014/0272425 A1 | | 9/2014 | Tamogami | |
| 2017/0130106 A1 | * | 5/2017 | Matsuki | C09J 11/04 |
| 2017/0174960 A1 | * | 6/2017 | Matsumura | C09J 11/06 |
| 2017/0204311 A1 | * | 7/2017 | Matsuki | C09J 175/16 |
| 2017/0260434 A1 | * | 9/2017 | Matsuki | C09J 11/06 |
| 2018/0223144 A1 | * | 8/2018 | Abe | C09J 175/04 |

FOREIGN PATENT DOCUMENTS

| | | |
|---|---|---|
| JP | S63-06076 | 1/1988 |
| JP | 2008-500406 | 1/2008 |
| JP | 2011-065087 | 3/2011 |
| JP | 2012-241182 | 12/2012 |
| WO | WO 2004/111102 | 12/2004 |

(Continued)

OTHER PUBLICATIONS

International Search Report for International Application No. PCT/JP2015/063200 dated Jul. 14, 2015, 4 pages, Japan.

*Primary Examiner* — Michael M Dollinger
(74) *Attorney, Agent, or Firm* — Thorpe North & Western

(57) ABSTRACT

A reactive hot-melt adhesive composition that is moisture curable contains: a urethane prepolymer having an isocyanate group, a (meth)acrylic resin, and an adhesion promoter containing at least an isocyanate group-containing (meth) acrylamide compound.

16 Claims, No Drawings

(56) References Cited

FOREIGN PATENT DOCUMENTS

| WO | WO 2011/034124 | 3/2011 |
| WO | WO 2012/026486 | 3/2012 |
| WO | WO 2012/161337 | 11/2012 |
| WO | WO 2013/084891 | 6/2013 |
| WO | WO 2015/016029 | 2/2015 |

\* cited by examiner

REACTIVE HOT-MELT ADHESIVE COMPOSITION

TECHNICAL FIELD

The present technology relates to a reactive hot-melt adhesive composition.

BACKGROUND ART

Conventionally, as a reactive hot-melt adhesive, a polyurethane hot-melt adhesive composition containing isocyanate and an acrylic polymer, where the acrylic polymer is a high molecular weight acrylic polymer, has been proposed (e.g., Japanese Unexamined Patent Application Publication (Translation of PCT Application) No. 2008-500406A).

However, the inventor of the present application found that conventional reactive hot-melt adhesives may not satisfy the level of adhesion, specifically water resistant adhesion, that has been required recently.

SUMMARY

The present technology provides a reactive hot-melt adhesive composition which has excellent water resistant adhesion.

The inventor of the present technology found that the composition containing: a urethane prepolymer having an isocyanate group, a (meth)acrylic resin, and an adhesion promoter containing at least an isocyanate group-containing (meth)acrylamide compound can be a reactive hot-melt adhesive that is moisture curable and that has excellent water resistant adhesion (in particular, excellent hot water resistant adhesion).

Specifically, (1) a reactive hot-melt adhesive composition that is moisture curable comprises:

a urethane prepolymer having an isocyanate group;
a (meth)acrylic resin; and
an adhesion promoter containing at least an isocyanate group-containing (meth)acrylamide compound.

(2) The reactive hot-melt adhesive composition according to (1) above, where the adhesion promoter is produced by reacting a hydroxy group-containing compound having a hydroxy group and a (meth)acrylamide group with a polyisocyanate 1.

(3) The reactive hot-melt adhesive composition according to (1) or (2) above, where an amount of the adhesion promoter is from 1 to 5 parts by mass per 100 parts by mass total of a polyol and a polyisocyanate 2 that are used in production of the urethane prepolymer and the (meth)acrylic resin.

(4) The reactive hot-melt adhesive composition according to any one of (1) to (3) above, where the urethane prepolymer is a compound produced by reacting at least one selected from the group consisting of bifunctional polyols and trifunctional polyols with polyisocyanate 2; and the bifunctional polyol is at least one type selected from the group consisting of polyoxypropylene diols, polyoxyethylene diols, and castor oil-based polyols.

(5) The reactive hot-melt adhesive composition according to (4) above, where a weight average molecular weight of the trifunctional polyol is 5,000 or greater.

(6) The reactive hot-melt adhesive composition according to (4) or (5) above, where an amount of the trifunctional polyol is from 5 to 50 mass % relative to a total amount of polyol(s) used in production of the urethane prepolymer.

The reactive hot-melt adhesive composition of the present technology has excellent water resistant adhesion.

DETAILED DESCRIPTION

The present technology is described in detail below.

The reactive hot-melt adhesive composition of the present technology (the composition of the present technology) is a reactive hot-melt adhesive composition that is moisture curable and that contains:

a urethane prepolymer having an isocyanate group,
a (meth)acrylic resin, and
an adhesion promoter containing at least an isocyanate group-containing (meth)acrylamide compound.

By allowing an adhesion promoter containing at least an isocyanate group-containing (meth)acrylamide compound to be contained, the composition of the present technology has excellent water resistant adhesion.

Although the reason is not clear, it is assumed to be as follows.

Since the isocyanate group-containing (meth)acrylamide compound contained in the reactive hot-melt adhesive composition of the present technology has an isocyanate group and a (meth)acrylamide group, the isocyanate group reacts with another component such as a urethane prepolymer in the composition, and the (meth)acrylamide group makes the wettability to base materials excellent. That is, the isocyanate group-containing (meth)acrylamide compound functions as an adhesion promoter that enhances the adhesion between the composition and the base material. It is conceived that, as a result, the composition of the present technology has excellent adhesion and maintains adhesion even when the composition is immersed in hot water or the like (i.e. excellent water resistant adhesion). This is also deduced from the fact that the case where no isocyanate group-containing (meth)acrylamide compound is contained as described below in a comparative example (Comparative Example 1) resulted in low shear strength retention ratio after water-resisting aging.

The urethane prepolymer will be described below. The urethane prepolymer contained in the composition of the present technology has an isocyanate group.

An example of a preferable aspect is one in which the urethane prepolymer is a urethane prepolymer having a plurality of isocyanate groups at molecular terminals in each molecule.

A conventionally known urethane prepolymer can be used as the urethane prepolymer. For example, a reaction product, obtained by reacting polyisocyanate with a compound having at least two active hydrogen-containing groups in each molecule (hereinafter, abbreviated as "active hydrogen compound") in a manner that the amount of the isocyanate group is in excess relative to the amount of the active hydrogen-containing groups, or the like can be used.

In the present technology, "active hydrogen-containing group" indicates "group containing an active hydrogen". Examples of the active hydrogen-containing group include a hydroxy group, an amino group, and an imino group.

Polyisocyanate 2

The polyisocyanate used during production of the urethane prepolymer is not particularly limited as long as the polyisocyanate has two or more isocyanate groups in each molecule (hereinafter, this polyisocyanate is referred to as "polyisocyanate 2").

Examples of the polyisocyanate 2 include aromatic polyisocyanates, such as tolylene diisocyanate (TDI; e.g. 2,4-tolylene diisocyanate and 2,6-tolylene diisocyanate), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethylhexamethylene diisocyanate (TMHDI), lysine diisocyanate, and norbornane diisocyanate (NBDI), transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates thereof; isocyanurate-modified polyisocyanates thereof; and allophanate-modified products thereof.

The polyisocyanate 2 is preferably an aromatic polyisocyanate and more preferably an MDI from the perspective of excellent curability.

The polyisocyanate 2 may be used alone, or a combination of two or more types of the polyisocyanates 2 may be used.

Active Hydrogen Compound

The compound having two or more active hydrogen-containing groups in each molecule (active hydrogen compound) that is used during production of the urethane prepolymer is not particularly limited. Examples of the active hydrogen-containing group include a hydroxy (OH) group, an amino group, and an imino group.

Preferred examples of the active hydrogen compound include polyols having two or more hydroxy (OH) groups in each molecule, polyamine compounds having two or more selected from the group consisting of amino groups and imino groups in each molecule, and the like. Among these, a polyol is preferable.

The active hydrogen compound may be used alone, or a combination of two or more types of the active hydrogen compounds may be used.

A polyol is a compound having two or more OH groups in each molecule.

Examples of the polyol include polyether polyols; castor oil-based polyols; polyester polyols; polymer polyols having a carbon-carbon bond in a main chain skeleton, such as acrylic polyols, polybutadiene diols, and hydrogenated polybutadiene polyols; low-molecular-weight polyhydric alcohols; and mixed polyols of these. Among these, preferred examples thereof include polyether polyols and castor oil-based polyols.

The polyether polyol is not particularly limited as long as the polyether polyol is a compound having a polyether as a main chain and having two or more hydroxy groups. "Polyether" is a group having two or more ether bonds, and specific examples thereof include a group having a total of two or more of structural units: —$R^a$—O—$R^b$—. Note that, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include polyoxyalkylene polyols, such as polyoxyethylene diol (polyethylene glycol), polyoxypropylene diol (polypropylene glycol; PPG), polyoxypropylene triol, ethylene oxide/propylene oxide copolymers, polytetramethylene ether glycol (PTMEG), and polytetraethylene glycol; sorbitol-based polyols; and the like.

The castor oil-based polyol is not particularly limited.

The polyol is preferably a bifunctional polyol (compound having two hydroxy groups in each molecule) and/or a trifunctional polyol (compound having three hydroxy groups in each molecule).

The bifunctional polyol is preferably polyoxyalkylene diol and/or castor oil-based diol, and more preferably at least one type selected from the group consisting of polyoxypropylene diol, polyoxyethylene diol, and castor oil-based diol.

The weight average molecular weight of the bifunctional polyol is preferably 5,000 or less, and more preferably from 2,000 to 4,000.

In the present technology, the weight average molecular weight of polyol is a value obtained by GPC analysis (solvent: tetrahydrofuran (THF)) based on calibration with polystyrene.

The amount of the bifunctional polyol is preferably from 30 to 80 parts by mass per 100 parts by mass total of a polyol and polyisocyanate 2 that are used in production of the urethane prepolymer and the (meth)acrylic resin.

As the bifunctional polyol, castor oil-based polyol (especially, castor oil-based diol) is preferably used from the perspective of even better adhesion to base materials (especially, olefin resins). The amount of the castor oil-based polyol is preferably from 5 to 30 mass % relative to the total amount of the polyol(s) used in production of the urethane prepolymer.

The trifunctional polyol is preferably polyoxyalkylene triol, and more preferably polyoxyethylene triol and polyoxypropylene triol.

The weight average molecular weight of the trifunctional polyol is preferably 3,000 or greater, and from the perspective of excellent viscosity, strength, and adhesion, more preferably from 5,000 to 10,000.

The amount of the trifunctional polyol is preferably from 5 to 50 mass %, and more preferably from 5 to 45 mass %, relative to the total amount of the polyol(s) used in production of the urethane prepolymer.

The method of producing the urethane prepolymer is not particularly limited. For example, the urethane prepolymer can be produced by using polyisocyanate in a manner that from 1.3 to 2.5 mol of isocyanate group is reacted per 1 mol of the active hydrogen-containing group (e.g. hydroxy group) contained in the active hydrogen compound, and mixing these to perform a reaction.

The urethane prepolymer may be used alone, or a combination of two or more types of the urethane prepolymers may be used.

A description of the (meth)acrylic resin is given below. The (meth)acrylic resin contained in the composition of the present technology is not particularly limited.

By allowing the composition of the present technology to contain the (meth)acrylic resin, high adhesion can be exhibited at an initial stage.

In the present technology, (meth)acryl means acryl or methacryl.

The (meth)acrylic resin is not particularly limited as long as the (meth)acrylic resin is a polymer formed by polymerizing an ethylenically unsaturated bond contained in a monomer at least containing (meth)acrylic monomers. Examples of the (meth)acrylic monomer include (meth)acrylate-based monomers, acidic functional group-containing (meth)acrylic monomers, tertiary amine-containing (meth)acrylic monomers, and hydroxy group-containing (meth)acrylic monomers.

The (meth)acrylic resin may be a homopolymer or a copolymer.

The production of the (meth)acrylic resin is not particularly limited. Examples thereof include conventionally known production methods.

The (meth)acrylic resin may be used alone, or a combination of two or more types of (meth)acrylic resins may be used.

The amount of the (meth)acrylic resin is preferably from 20 to 50 parts by mass per 100 parts by mass of the urethane prepolymer from the perspective of excellent initial strength.

The adhesion promoter will be described below.

The adhesion promoter contained in the composition of the present technology contains at least an isocyanate group-containing (meth)acrylamide compound.

An example of preferable aspects is one in which a part of the adhesion promoter is an isocyanate group-containing (meth)acrylamide compound. All of the adhesion promoter may be an isocyanate group-containing (meth)acrylamide compound.

The isocyanate group-containing (meth)acrylamide compound will be described below.

The isocyanate group-containing (meth)acrylamide compound contained in the adhesion promoter is not particularly limited as long as the isocyanate group-containing (meth)acrylamide compound is a compound having at least one isocyanate group and at least one (meth)acrylamide group in each molecule.

In the present technology, the (meth)acrylamide group refers to a group represented by $CH_2=CR-CO-N$ (R is a hydrogen atom or a methyl group).

The isocyanate group and the (meth)acrylamide group may be bonded via, for example, a hydrocarbon group that may have a hetero atom, such as an oxygen atom, a nitrogen atom, or a sulfur atom.

Note that the adhesion promoter contained in the composition of the present technology does not contain a (meth)acrylic resin.

From the perspective of even better water resistant adhesion, an example of a preferable aspect is one in which the adhesion promoter is produced by reacting a hydroxy group-containing compound having a hydroxy group and a (meth)acrylamide group with polyisocyanate 1.

The polyisocyanate 1 used in the production of the adhesion promoter is not particularly limited as long as the polyisocyanate 1 is a compound having two or more isocyanate groups in each molecule. Examples thereof are the same as those for the polyisocyanate 2. Specific examples thereof include modified products of aliphatic polyisocyanate. Examples of the modified product of aliphatic polyisocyanate include allophanate-modified products, isocyanurate-modified products, and modified products of trimethylolpropane.

In particular, from the perspective of excellent workability (handleability of the promoter), an allophanate-modified product of aliphatic polyisocyanate is preferable. Examples of the allophanate-modified product of aliphatic polyisocyanate include allophanate-modified products of hexamethylene diisocyanate.

The hydroxy group-containing compound used in production of the adhesion promoter is not particularly limited as long as the hydroxy group-containing compound is a compound having at least one hydroxy group and at least one (meth)acrylamide group in each molecule.

Examples thereof include compounds in which at least one hydrocarbon group having a hydroxy group is bonded to a nitrogen atom contained in the (meth)acrylamide group. Examples of the hydrocarbon group having a hydroxy group include alkyl groups having a hydroxy group.

The number of the hydroxy group contained in the hydroxy group-containing compound is preferably one in each molecule.

Examples of the hydroxy group-containing compound include N-hydroxyethyl (meth)acrylamide (HEAA) and N-hydroxymethyl (meth)acrylamide.

As the production method of the adhesion promoter, for example, the adhesion promoter can be produced by mixing a hydroxy group-containing compound and polyisocyanate 1 in an amount in which the index (molar ratio of NCO/OH) is 2 to 10, and reacting these in a nitrogen atmosphere.

Examples of the isocyanate group-containing (meth)acrylamide compound contained in the adhesion promoter include compounds formed by reacting at least one (but not all) of the plurality of isocyanate groups contained in the polyisocyanate 1 with a hydroxy group of the hydroxy group-containing compound (in each molecule, allophanate bond as well as (meth)acrylamide group, urethane bond, and isocyanate group may be contained).

Examples of the isocyanate group-containing (meth)acrylamide compound include compounds represented by Formula (1) below.

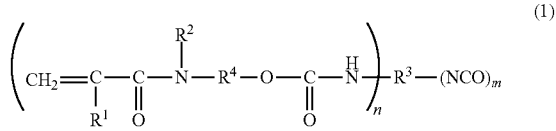

In Formula (1), $R^1$ represents a hydrogen atom or a methyl group.

In Formula (1), $R^2$ represents a hydrogen atom or a hydrocarbon group. $R^2$ is preferably a hydrogen atom.

In Formula (1), $R^3$ and $R^4$ each independently represent a hydrocarbon group that may have a hetero atom, such as an oxygen atom, a nitrogen atom, or a sulfur atom. In $R^3$, at least one carbon atom in the hydrocarbon group may be substituted by an allophanate bond. The allophanate bond is not particularly limited. $R^4$ is preferably an aliphatic hydrocarbon group.

In Formula (1), m and n are each independently 1 or greater, and preferably 1 to 2. m+n is preferably 2 to 3, and more preferably 2.

The hydrocarbon group is not particularly limited. The number of carbons contained in the hydrocarbon group may be from 1 to 30. Examples of the hydrocarbon group include aliphatic hydrocarbon groups having from 1 to 30 carbons, cycloaliphatic hydrocarbon groups having from 3 to 30 carbons, aromatic hydrocarbon groups having from 6 to 30 carbons, and combinations thereof. The hydrocarbon group may be a straight-chain or branched hydrocarbon group, and may have an unsaturated bond.

Note that the hydrocarbon group are exemplified as being monovalent or di- or higher valent. The same applies to examples of various hydrocarbon groups described below.

Examples of the aliphatic hydrocarbon group include a methyl group, an ethyl group, a propyl group, a butyl group, a pentyl group, a hexyl group, an octyl group, a decyl group, and an eicosyl group.

Examples of the alicyclic hydrocarbon group include a cyclopentyl group and a cyclohexyl group.

Examples of the aromatic hydrocarbon group include a phenyl group, a naphthalene ring, and an anthracene ring.

When the hydrocarbon group has a hetero atom, for example, at least one of the carbon atoms in the hydrocarbon group having two or more carbons may be substituted by hetero atom(s) or functional group(s) having a hetero atom (e.g. functional group that is di- or higher valent), and/or at least one of the hydrogen atoms in the hydrocarbon group (in this case, the number of carbons is not limited) may be substituted by functional group(s) having a hetero atom (e.g. functional group that is monovalent).

Examples of the functional group include monovalent functional groups, such as a hydroxy group, an amino group, a mercapto group, an isocyanate group, and an alkoxysilyl group; and functional groups that are di- or higher valent, such as a carbonyl group, a urethane bond, a urea bond, an allophanate bond, and an ester bond.

When at least one of the carbon atoms in the hydrocarbon group is substituted by hetero atom(s), the hetero atom(s) can form an ether bond, secondary amine, tertiary amine, or sulfide bond.

In the present technology, the adhesion promoter may further contain a (meth)acrylamide compound having no isocyanate group, in addition to the isocyanate group-containing (meth)acrylamide compound.

Examples of the (meth)acrylamide compound having no isocyanate group include compounds produced by reacting all of the isocyanate groups contained in the polyisocyanate 1 with the hydroxy group-containing compounds in the reaction between the hydroxy group-containing compound and the polyisocyanate 1.

In the present technology, the adhesion promoter may further contain the polyisocyanate 1 that has not undergone the reaction with the hydroxy group-containing compound, in addition to the isocyanate group-containing (meth)acrylamide compound. The polyisocyanate 1 that has not undergone the reaction with the hydroxy group-containing compound may be unreacted or may be an oligomer of the polyisocyanate 1.

In the present technology, the amount of the adhesion promoter is preferably from 1 to 5 parts by mass per 100 parts by mass total of the urethane prepolymer and the (meth)acrylic resin from the perspective of even better water resistant adhesion.

The composition of the present technology may further contain a reaction catalyst from the perspective of excellent curability. The reaction catalyst is not particularly limited as long as the reaction catalyst promotes reaction of isocyanate groups. Examples thereof include dimorpholinodiethylether.

The amount of the reaction catalyst is not particularly limited. For example, the amount of the reaction catalyst may be the same as conventionally known amount.

The composition of the present technology may contain, as necessary, additives, such as adhesion promoters other than the adhesion promoter contained in the composition of the present technology, fillers (e.g. carbon black and calcium carbonate), plasticizers, anti-aging agents, antioxidants, pigments, thixotropic agents, ultraviolet absorbers, flame retardants, surfactants, dispersing agents, dehydrating agents, and antistatic agents, in a range that does not inhibit the object of the present technology. The amounts of the additives are not particularly limited. For example, the amounts of the additives may be the same as conventionally known amounts.

The method of producing the composition of the present technology is not particularly limited. For example, the composition of the present technology can be produced by agitating a polyol that is used in production of the urethane prepolymer and a (meth)acrylic resin at 120° C. under reduced pressure, dehydrating the mixture of the polyol and the (meth)acrylic resin, then adding a polyisocyanate 2 used in production of the urethane prepolymer to the mixture after the dehydration in a condition at 120° C., allowing these to react to produce a mixture of the urethane prepolymer and the (meth)acrylic resin, adding and mixing an adhesion promoter and a reaction catalyst and an additive, which may be added as necessary, to the mixture.

The composition of the present technology may be formed into a one-part composition or a two-part composition.

When the composition of the present technology is used in a two-part composition, the composition of the present technology can be used as the main agent (first liquid), and a set of the main agent and a curing agent (curing agent in a broad sense; second liquid) can be formed.

The curing agent in a broad sense (second liquid) is not particularly limited as long as the curing agent contains a curing agent (curing agent in a narrow sense) as a curing component, and as long as the curing agent in a narrow sense is a compound that can react with the urethane prepolymer. Examples thereof include conventionally known curing agents.

Examples of the base material to which the composition of the present technology can be applied include plastics, glass, rubbers, metals, and the like.

Examples of the plastic include olefin resins, such as polypropylene and polyethylene, polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, ABS (acrylonitrile butadiene styrene) resins, and hardly adhesive resins, such as polyamide resins.

The base material may have undergone a surface treatment. Examples of the surface treatment include flame treatment, corona treatment, and plasma treatment. These treatments are not particularly limited. Examples thereof include conventionally known methods.

The composition of the present technology is a reactive hot-melt adhesive composition that is moisture curable, and the composition of the present technology can be applied to a base material by heating and melting the composition.

The temperature at which the composition of the present technology is heated is preferably from 110 to 130° C.

The application method to the base material is not particularly limited. Examples thereof include conventionally known methods.

The composition of the present technology is a reactive hot-melt adhesive composition that is moisture curable, and the composition of the present technology can be reacted and cured by moisture. For example, the composition of the present technology can be cured in the condition of 5 to 90° C. at a relative humidity of 5 to 95 (% RH).

Note that, in the present technology, an example of a preferable aspect is one in which the composition of the present technology is not cured by irradiating with light such as ultraviolet light.

As the use of the composition of the present technology, the composition can be used in fields where moisture-curable hot-melt adhesives have been conventionally used. Examples thereof include adhesives for exterior materials and interior materials for building materials, adhesives for interior materials and exterior materials for use in automobiles, and the like.

EXAMPLES

The present technology is described below in detail using examples. However, the present technology is not limited to these examples.

Production of Urethane Prepolymer

The components (except the polyisocyanate 2-1) shown in the row of the urethane prepolymer in Table 1 and the (meth)acrylic resin were charged in a reaction vessel in amounts (part by mass) shown in the same table, agitated at 120° C. under reduced pressure for 2 hours to dehydrate a mixture of the polyol and the (meth)acrylic resin. Thereafter, the polyisocyanate 2-1 shown in the row of the urethane prepolymer in Table 1 was added in an amount (part by mass) shown in the same table to the mixture after dehydration in a condition at 120° C., reacted under ambient pressure for 1 hour, further agitated under reduced pressure for 1 hour to produce a mixture of the urethane prepolymer and the (meth)acrylic resin. Note that the urethane prepolymer has an isocyanate group at a terminal thereof.

Production of Composition

To the mixture of the urethane prepolymer produced as described above (the amount of the urethane prepolymer is the total amount of the components shown in the row of the urethane prepolymer in Table 1) and the (meth)acrylic resin, the adhesion promoter and the reaction catalyst shown in Table 1 were added in amounts (part by mass) shown in Table 1 and mixed using an agitator to produce a composition.

Evaluation

The following evaluations were performed using the compositions produced as described above. The results are shown in Table 1.

Initial Viscosity

The melt viscosity of the composition was measured using a Brookfield Viscometer (DV2T viscometer, manufactured by Brookfield AMETEK; No. 27 rotor; rotational speed: 5.0 rpm) in a condition at 120° C. Specifically, the composition was heated in advance to 120° C., and 11 g of the composition was weighed in a cup of the viscometer. The cup was set in the viscometer and heated at 120° C. for 15 minutes, then a rotor was set, and further heating was performed for 15 minutes. Thereafter, the measurement was started, and the value after 2 minutes was used as an initial viscosity.

Viscosity Increase Percentage after Aging

After the initial viscosity was measured, the composition was left in a condition at 120° C. for 90 minutes, and then viscosity measurement was started. The numerical value after 2 minutes from the start was read and used as the melt viscosity after aging. The value was then substituted into the formula below to calculate the viscosity increase percentage after aging.

Viscosity increase percentage after aging (%)=[(melt viscosity after aging−initial viscosity)/initial viscosity]×100

Initial Shear Strength

The composition produced as described above was melted at 120° C. and applied on polypropylene (having undergone a plasma treatment) having a width of 2.5 cm and a length of 5 cm. The polypropylene was compression-bonded with polycarbonate having a width of 2.5 cm and a length of 5 cm to form a lapped surface (width: 2.5 cm, length: 1 cm; thickness of the composition at the lapped surface: 5 mm) to produce a test piece.

The test piece was cured for 1 hour in a condition at 20° C. and 50% RH, and used as an initial sample.

The shear strength of the initial sample (initial shear strength) was measured at a tensile test speed of 50 mm/min in a condition at 20° C.

Shear Strength after Normal State Test

The initial sample obtained as described above was cured in a condition at 20° C. and 65% RH for 7 days to obtain a sample for normal state test.

The shear strength was measured using the sample for normal state test at a tensile test speed of 50 mm/min in a condition at 20° C. or at 120° C.

Shear Strength after Heat Resistance Test

The heat resistance test was performed by leaving the sample for normal state test obtained as described above in a condition at 120° C. for 7 days. The sample obtained after 7 days was used as a sample for heat resistance evaluation.

The shear strength was measured using the sample for heat resistance evaluation at a tensile test speed of 50 mm/min in a condition at 20° C. The shear strength after the heat resistance test (measured in a condition at 20° C.) was evaluated as being "excellent" when the shear strength after the heat resistance test was 70% or higher of the shear strength at normal state (shear strength after the normal state test described above (measured in a condition at 20° C.)).

Shear Strength after Water Resistant Adhesion Test

The hot water resistance test was performed by immersing the sample for normal state test obtained as described above in hot water at 40° C. for 7 days. After 7 days, the sample was taken out from the hot water and used as a sample for water resistant adhesion evaluation.

The shear strength was measured using the sample for water resistant adhesion evaluation at a tensile test speed of 50 mm/min in a condition at 20° C.

The water resistant adhesion was evaluated as being "excellent" when the retention ratio ("shear strength retention ratio after water-resisting aging" in Table 1) of the shear strength after the hot water resistance test (measured in a condition at 20° C.) was 70% or higher of the shear strength at normal state (shear strength after the normal state test described above (measured in a condition at 20° C.)).

TABLE 1

|  |  | Working Examples | | | | |
| --- | --- | --- | --- | --- | --- | --- |
|  |  | 1 | 2 | 3 | 4 | 5 |
| Urethane prepolymer | Polyoxypropylene diol (PLEMINOL 510, manufactured by Asahi Glass Co., Ltd.; Mw: 4,000) | 37 | 30 | 38 | 37 | 37 |
|  | Polyoxyethylene diol (PEG#2000U, manufactured by NOF Corporation; Mw: 2,000) | 15 | 15 | 15 | 15 | 15 |
|  | Castor oil polyol (bifunctional, URIC #2766, manufactured by | 7 | 7 |  | 14 | 7 |

TABLE 1-continued

| | | | | | | |
|---|---|---|---|---|---|---|
| | Itoh Oil Chemicals Co., Ltd.; Mw: 2,000) | | | | | |
| | Polyoxypropylene triol 1 (PLEMINOL S3011, manufactured by Asahi Glass Co., Ltd.; Mw: 10,000) | 7 | 15 | 15 | | |
| | Polyoxypropylene triol 2 (EXCENOL 3030, manufactured by Asahi Glass Co., Ltd.; Mw: 3,000) | | | | | 7 |
| | Polyisocyanate 2-1 (diphenylmethane diisocyanate) | 9 | 8 | 7 | 9 | 9 |
| | Total content of components above used in production of urethane prepolymer | 75 | 75 | 75 | 75 | 75 |
| (Meth)acrylic resin | Acrylic resin (Dianal BR 106, manufactured by Mitsubishi Rayon Co., Ltd.; Tg: 50° C.; Mw: 60,000) | 25 | 25 | 25 | 25 | 25 |
| | Adhesion promoter 1 | 3 | 3 | 3 | 3 | 3 |
| | Adhesion promoter 2 | | | | | |
| Reaction catalyst | DMDEE (Mitsui Fine Chemicals, Inc.) | 0.1 | 0.1 | 0.1 | 0.1 | 0.1 |
| Initial viscosity [cps] | Initial, at 120° C. | 15000 | 19850 | 16500 | 16000 | 21500 |
| Viscosity increase percentage after aging (%) | Viscosity increase percentage after 90 min at 120° C. | 5.1% | 8.6% | 9.2% | 5.5% | 15.9% |
| Initial shear strength [MPa] | After 1 hour at 20° C. | 1.0 | 1.0 | 0.9 | 0.6 | 1.1 |
| Shear strength after normal state test [MPa] | Normal state test: 20° C. for 7 days (shear strength was measured in an environment at 20° C.) | 4.1 | 4.5 | 3.7 | 4.1 | 4.8 |
| | Normal state test: 20° C. for 7 days (shear strength was measured in an environment at 120° C.) | 1.3 | 1.8 | 1.1 | 0.8 | 1.9 |
| Shear strength after heat resistance test [MPa] | (Heat resistance) normal state test: 20° C. for 7 days → heat resistance test: 120° C. for 7 days (shear strength was measured in an environment at 20° C.) | 4.7 | 5.0 | 3.3 | 3.1 | 5.1 |
| Shear strength after hot water resistance test [MPa] | (Hot water resistance) normal state test: 20° C. for 7 days → hot water resistance test: 40° C. hot water for 7 days (shear strength was measured in an environment at 20° C.) | 3.9 | 3.8 | 2.9 | 3.0 | 3.5 |
| | Shear strength retention ratio after water-resisting aging (%) | 95% | 84% | 78% | 73% | 73% |

| | | Working Examples | | Comparative Examples | |
|---|---|---|---|---|---|
| | | 6 | 7 | 1 | 2 |
| Urethane prepolymer | Polyoxypropylene diol (PLEMINOL 510, manufactured by Asahi Glass Co., Ltd.; Mw: 4,000) | 15 | 37 | 37 | 50 |
| | Polyoxyethylene diol (PEG#2000U, manufactured by NOF Corporation; Mw: 2,000) | 15 | 15 | 15 | 20 |
| | Castor oil polyol (bifunctional, URIC #2766, manufactured by Itoh Oil | 7 | 7 | 7 | 9 |

TABLE 1-continued

| | | | | | |
|---|---|---|---|---|---|
| | Chemicals Co., Ltd.; Mw: 2,000) | | | | |
| | Polyoxypropylene triol 1 (PLEMINOL S3011, manufactured by Asahi Glass Co., Ltd.; Mw: 10,000) | 30 | 7 | 7 | 9 |
| | Polyoxypropylene triol 2 (EXCENOL 3030, manufactured by Asahi Glass Co., Ltd.; Mw: 3,000) | | | | |
| | Polyisocyanate 2-1 (diphenylmethane diisocyanate) | 5 | 9 | 9 | 12 |
| | Total content of components above used in production of urethane prepolymer | 72 | 75 | 75 | 100 |
| (Meth)acrylic resin | Acrylic resin (Dianal BR 106, manufactured by Mitsubishi Rayon Co., Ltd.; Tg: 50° C.; Mw: 60,000) | 25 | 25 | 25 | |
| | Adhesion promoter 1 | 3 | | | 3 |
| | Adhesion promoter 2 | | 3 | | |
| Reaction catalyst | DMDEE (Mitsui Fine Chemicals, Inc.) | 0.1 | 0.1 | 0.1 | 0.1 |
| Initial viscosity [cps] | Initial, at 120° C. | 31000 | 18000 | 16700 | 9800 |
| Viscosity increase percentage after aging (%) | Viscosity increase percentage after 90 min at 120° C. | 23.5% | 7.1% | 4.9% | 8.2% |
| Initial shear strength [MPa] | After 1 hour at 20° C. | 1.5 | 1.2 | 1.2 | Uncured |
| Shear strength after normal state test [MPa] | Normal state test: 20° C. for 7 days (shear strength was measured in an environment at 20° C.) | 5.2 | 4.3 | 4.1 | 2.6 |
| | Normal state test: 20° C. for 7 days (shear strength was measured in an environment at 120° C.) | 3.2 | 1.2 | 1.1 | 0.4 |
| Shear strength after heat resistance test [MPa] | (Heat resistance) normal state test: 20° C. for 7 days → heat resistance test: 120° C. for 7 days (shear strength was measured in an environment at 20° C.) | 5.5 | 4.5 | 3.5 | 1.9 |
| Shear strength after hot water resistance test [MPa] | (Hot water resistance) normal state test: 20° C. for 7 days → hot water resistance test: 40° C. hot water for 7 days (shear strength was measured in an environment at 20° C.) | 3.9 | 4.0 | 1.9 | 1.6 |
| Shear strength retention ratio after water-resisting aging (%) | | 75% | 93% | 46% | 62% |

Details of the components shown in Table 1, from the adhesion promoter 1 to the reaction catalyst, are as follows.

Adhesion promoter 1: a reaction product was obtained by mixing 9.4 g of HEAA (N-(2-hydroxyethyl)acrylamide, manufactured by Kohjin) and 89.6 g of polyisocyanate 1-1 (allophanate product of hexamethylene diisocyanate (HDI); trade name: Takenate D-178NL, manufactured by Mitsui Chemicals, Inc.; containing two isocyanate groups in each molecule) (at this time, the molar ratio of NCO/OH was 5) and then reacting these in a nitrogen atmosphere at 60° C. for 12 hours.

The obtained reaction product was a mixture containing a compound produced by reacting one of the two isocyanate groups contained in the polyisocyanate 1-1 with the HEAA (in addition to an acrylamide group, a urethane bond, and an isocyanate group, also containing an allophanate bond in each molecule), a compound produced by reacting both of the two isocyanate groups contained in the polyisocyanate 1-1 with the HEAA, and the polyisocyanate 1-1 that has not reacted with the HEAA.

The mixture produced as described above was used as the adhesion promoter 1.

Adhesion promoter 2: a reaction product was obtained by performing an experiment similar to the adhesion promoter 1 except for replacing the HEAA used in the adhesion promoter 1 with N-hydroxymethylacrylamide (manufactured by Tokyo Chemical Industry Co., Ltd.). Note that the amount of the N-hydroxymethylacrylamide was an amount where the index=5.

The obtained reaction product was a mixture containing a compound produced by reacting one of the two isocyanate groups contained in the polyisocyanate 1-1 with the N-hydroxymethylacrylamide, a compound produced by reacting both of the two isocyanate groups contained in the polyisocyanate 1-1 with the N-hydroxymethylacrylamide, and the polyisocyanate 1-1 that has not reacted with the N-hydroxymethylacrylamide.

The mixture produced as described above was used as the adhesion promoter 2.

Reaction catalyst DMDEE: dimorpholinodiethylether, manufactured by Mitsui Fine Chemicals, Inc.

As is clear from the results shown in Table 1, Comparative Example 1 which contained no adhesion promoter exhibited low water resistant adhesion. That is, the shear strength retention ratio after the water-resisting aging (shear strength after hot water resistance test/shear strength after normal state test (measured in a condition at 20° C.)) was low.

Comparative Example 2 which contained no (meth)acrylic resin was not cured at the initial stage and exhibited low adhesion after the normal state test, low heat resistant adhesion, and low water resistant adhesion.

In contrast, Working Examples 1 to 7 exhibited excellent water resistant adhesion. The shear strength retention ratio after the water-resisting aging (shear strength after hot water resistance test/shear strength after normal state test (measured in a condition at 20° C.)) was high.

Furthermore, when Working Example 1 and Working Example 5 are compared regarding the weight average molecular weights of polyoxyalkylene triols used in production of the urethane prepolymers, Working Example 1, in which the weight average molecular weight of the polyoxyalkylene triol was greater, exhibited even better water resistant adhesion than that of Working Example 5.

When Working Example 1 and Working Example 7 are compared regarding the hydroxy group-containing compounds used in production of the adhesion promoters, Working Example 1 exhibited even better water resistant adhesion than that of Working Example 7.

The invention claimed is:

1. A reactive hot-melt adhesive composition that is moisture curable,
the reactive hot-melt adhesive composition comprising:
a urethane prepolymer having an isocyanate group;
a (meth)acrylic resin; and
an adhesion promoter containing at least an isocyanate group-containing (meth)acrylamide compound.

2. The reactive hot-melt adhesive composition according to claim 1, wherein the adhesion promoter is produced by reacting a hydroxy group-containing compound having a hydroxy group and a (meth)acrylamide group with a polyisocyanate 1.

3. The reactive hot-melt adhesive composition according to claim 1, wherein an amount of the adhesion promoter is from 1 to 5 parts by mass per 100 parts by mass total of a polyol and a polyisocyanate 2 that are used in production of the urethane prepolymer and the (meth)acrylic resin.

4. The reactive hot-melt adhesive composition according to claim 1, wherein the urethane prepolymer is a compound produced by reacting at least one selected from the group consisting of bifunctional polyols and trifunctional polyols with polyisocyanate 2; and
the bifunctional polyol is at least one type selected from the group consisting of polyoxypropylene diols, polyoxyethylene diols, and castor oil-based polyols.

5. The reactive hot-melt adhesive composition according to claim 4, wherein a weight average molecular weight of the trifunctional polyol is 5,000 or greater.

6. The reactive hot-melt adhesive composition according to claim 4, wherein an amount of the trifunctional polyol is from 5 to 50 mass % relative to a total amount of polyol used in production of the urethane prepolymer.

7. The reactive hot-melt adhesive composition according to claim 2, wherein an amount of the adhesion promoter is from 1 to 5 parts by mass per 100 parts by mass total of a polyol and a polyisocyanate 2 that are used in production of the urethane prepolymer and the (meth)acrylic resin.

8. The reactive hot-melt adhesive composition according to claim 7, wherein the urethane prepolymer is a compound produced by reacting at least one selected from the group consisting of bifunctional polyols and trifunctional polyols with polyisocyanate 2; and
the bifunctional polyol is at least one type selected from the group consisting of polyoxypropylene diols, polyoxyethylene diols, and castor oil-based polyols.

9. The reactive hot-melt adhesive composition according to claim 8, wherein a weight average molecular weight of the trifunctional polyol is 5,000 or greater.

10. The reactive hot-melt adhesive composition according to claim 9, wherein an amount of the trifunctional polyol is from 5 to 50 mass % relative to a total amount of polyol used in production of the urethane prepolymer.

11. The reactive hot-melt adhesive composition according to claim 8, wherein an amount of the trifunctional polyol is from 5 to 50 mass % relative to a total amount of polyol used in production of the urethane prepolymer.

12. The reactive hot-melt adhesive composition according to claim 2, wherein the urethane prepolymer is a compound produced by reacting at least one selected from the group consisting of bifunctional polyols and trifunctional polyols with polyisocyanate 2; and
the bifunctional polyol is at least one type selected from the group consisting of polyoxypropylene diols, polyoxyethylene diols, and castor oil-based polyols.

13. The reactive hot-melt adhesive composition according to claim 12, wherein a weight average molecular weight of the trifunctional polyol is 5,000 or greater.

14. The reactive hot-melt adhesive composition according to claim 13, wherein an amount of the trifunctional polyol is from 5 to 50 mass % relative to a total amount of polyol used in production of the urethane prepolymer.

15. The reactive hot-melt adhesive composition according to claim 12, wherein an amount of the trifunctional polyol is from 5 to 50 mass % relative to a total amount of polyol used in production of the urethane prepolymer.

16. The reactive hot-melt adhesive composition according to claim 5, wherein an amount of the trifunctional polyol is from 5 to 50 mass % relative to a total amount of polyol used in production of the urethane prepolymer.

* * * * *